United States Patent [19]

Addink et al.

[11] Patent Number: 5,161,214
[45] Date of Patent: Nov. 3, 1992

[54] METHOD AND APPARATUS FOR DOCUMENT IMAGE MANAGEMENT IN A CASE PROCESSING SYSTEM

[75] Inventors: Marvin Addink, Sioux Falls, S. Dak.; Cheney Y. Hu, Germantown; Todd Leyba, Gaithersburg, both of Md.; John J. Mullen, Purcellville, Va.; Carolyn A. Till, Gaithersburg; Andrew W. Holmes, Bethesda, both of Md.

[73] Assignee: International Business Machines Corporation, Armonk, N.Y.

[21] Appl. No.: 573,942

[22] Filed: Aug. 28, 1990

[51] Int. Cl.$^5$ .................................................. G06F 3/14
[52] U.S. Cl. ...................................... 395/145; 395/600
[58] Field of Search ................................ 395/145, 600

[56] References Cited

U.S. PATENT DOCUMENTS 4,503,499  3/1985  Mason et al. ............................ 364/200
4,918,588  4/1990  Barrett et al. ............................ 364/200

OTHER PUBLICATIONS

Exhibit A: IBM ImagePlus Systems AS/400 and System/36 Overview Product Announcement, Jun. 28, 1988, (3 pages).
Exhibit B: IBM ImagePlus and System/36 Workfolder Application Facility, Jun. 28, 1988 Product Announcement (4 pages).
Exhibit C: Optical Storage Support PRPQs for System/36 5363 System Product Announcement, Jun. 28, 1988 (7 pages).

Primary Examiner—David L. Clark
Attorney, Agent, or Firm—John E. Hoel

[57] ABSTRACT

An improved method manages the storage of document images so as to minimize the average access time while minimizing overall storage costs, consistent with the probable usage of the documents for a particular application. Document images can be selectively stored on high speed, low capacity magnetic DASD or alternately on low speed, high capacity optical storage. DASD storage is more expensive than optical storage for a document image. By characterizing the probable use of a document image in association with a case processing work flow within which the document image is to participate, optimum document storage can be achieved. When a case has a predefined plurality of document image types, and a particular document image type is missing, the case can be placed in a pending state while awaiting the receipt of the missing document image. In the pending state, the documents which are members of the pended case can be removed from the DASD and retained on the optical storage device. A notation as to the missing document type is associated with the pended case. When the missing document type is received, the case of which it is to be a member, is reactivated by accessing the existing documents for the case from the optical storage and transferring them to the DASD, along with storing the newly received missing document. The case with its full complement of documents is then made available to the user. Provision is made for prohibiting the deletion of a document image from the DASD when other active cases have that document as a member.

4 Claims, 8 Drawing Sheets

FIG. 2        MEMORY 108

| DOCUMENT FILE (ALL DOCS) 202 | | | 220 | |
|---|---|---|---|---|
| DOC ID | DASD ADDR | OPTICAL ADDR | USE CNT | DASD EXP DATE |

| CASE FOLDER FILE (ALL CASES) 204 | | |
|---|---|---|
| CASE ID | IDENTIFIER | STATUS |

| CASE CROSS REFERENCE FILE (ALL DOCS) 206 | |
|---|---|
| CASE ID | DOC ID |

| CASE PENDING LIST FILE 208 | | | |
|---|---|---|---|
| CASE ID | REASON TO PEND DOC TYPE / DATE EXP | OTHER DATA FOR MATCHING | RETURN QUEUE |

| DOCUMENT DELETION LIST FOR DASD 210 | |
|---|---|
| DOC ID | DASD ADDRESS |

| WORK QUEUE FILE (ALL QUEUES) 212 | |
|---|---|
| QUEUE ID | CASE ID |

| RETRIEVE (STAGING) FILE 214 | |
|---|---|
| DOC ID | OPTICAL ADDRESS |

| OPTICAL STORE FILE 216 | |
|---|---|
| DOC ID | DASD ADDRESS |

| REACTIVATE LIST FILE 218 | |
|---|---|
| CASE ID | DOC IDS TO BE RETRIEVED |

| APPLICATION PROGRAM |
|---|

| OPERATING SYSTEM |
|---|

FIG. 8

DOCUMENT TYPE PROFILE

STATUS . . . . . : ADD / UPDATE

TYPE INFORMATION, PRESS ENTER.

```
DOCUMENT TYPE · · · · · · · · · · :   XXXXXXXX
DESCRIPTION · · · · · · · · · · · ·   _____
STORE ON OPTICAL · · · · · · · · · - Y = YES, N = NO
DAYS STORED ON DASD · · · · · · · - 1 - 999
CREATE NEW CASE · · · · · · · · · - 1 = YES, 2 = NO, 3 = BOTH
ALLOW SCAN AND INDEX · · · · · · · - Y = YES, N = NO
ALLOW IMPORT AND INDEX · · · · · · - Y = YES, N = NO
    DATA TYPE · · · · · · · · · · · - 01 = DATA, 02 = MO : DCA
    ADD / UPDATE PAGE IDS · · · · · - Y = YES, N = NO
ALLOW PENDING · · · · · · · · · · · - Y = YES, N = NO
    MAXIMUM DAYS PENDED · · · · · · - 1 - 999
    DASD STORAGE CONTROL · · · · · · - Y = YES, N = NO
    ADD TO PEND LIST · · · · · · · · - Y = YES, N = NO
    REQUIRE PEND DATA · · · · · · · - Y = YES, N = NO
```

MORE . . .

F1 = HELP               F3 = EXIT        F5 = REFRESH
F7 = PREVIOUS DOCUMENT TYPE              F24 = MORE KEYS

METHOD AND APPARATUS FOR DOCUMENT IMAGE MANAGEMENT IN A CASE PROCESSING SYSTEM

BACKGROUND OF THE INVENTION

1. Technical Field

The invention disclosed broadly relates to data processing systems and methods and more particularly relates to the management of document images in a case processing system.

2. Related Inventions

The following patent applications are assigned to the IBM Corporation and are incorporated herein by reference:

- U.S. patent application Ser. No. 211,646, filed Jun. 27, 1988 entitled "Dual Density Digital Image System."
- U.S. patent application Ser. No. 211,722, filed Jun. 27, 1988 entitled "Object Management and Delivery System Having Multiple Object-Resolution Capability."
- U.S. patent application Ser. No. 326,338, filed Mar. 21, 1989 entitled "Method and Apparatus for Merging a Digitized Image With an Alphanumeric Character String."
- U.S. patent application Ser. No. 407,184, filed Sep. 14, 1989 entitled "Distributed Image Storage and Retrieval System."
- U.S. patent application Ser. No. 478,325, filed Feb. 12, 1990 entitled "Method and Apparatus for Adaptive Image Processing."

3. Background Information

In the past, documents have been stored in the hard copy form. The storage space, loss of documents, misplacement of documents, and the retrieval of hard copy documents created many problems facing applications which process large volumes of documents. High storage costs, lost productivity, personnel costs and poor responsiveness have been characteristics of earlier document processing. Until recently, technology could not provide a cost-effective approach for reducing the disadvantages of storing and manipulating documents on hard copy. However, image storage and retrieval systems such as those described in the above referenced patent applications, have provided an effective and comprehensive solution to both the paper and the work flow problems. What is now needed, is a method for document image management in a case processing system.

4. Definitions

The following definitions will be used herein.

Case: A uniquely identifiable work item initiated by a user. The case may be active, that is open and being worked, pended, that is suspended awaiting further information, closed where the processing is complete, new or not yet processed, and uncued.

Case File: A file that contains one entry for each case.

Case ID: A system assigned ID which is chronological based on the time that indexing occurred. Every case has a unique case ID.

DASD: A direct access storage device, a device in which access time is effectively independent of the location of the data.

Departmental Processor: A system that contains a case processing program. Such a system provides a user interface software, optical library system, and CPU host.

Document: One or more physical pages. The contents or bounds of a document are initially determined by the creator of the document and they include the packaging medium such as an envelope.

Document Type Profile: A file that contains one entry for each type of document to be processed.

Folder: A folder represents a logical collection of documents of one or more pages related by unique identifier, corresponding to a case.

Identifier: The highest level value used to index, search or access documents in the system, for example a policy number or social security number. There may be more than one case for each identifier.

Index: The process of associating a scanned image with a case or identifier.

Optical Library Storage: The hardware and software that provides the long term storage of the image data on an optical storage medium.

Page Image: The electronic representation of a single physical page. The bounds of a page image are determined by the electro-mechanical characteristics of the scanning equipment, along with the image capture application specifications in the receiving data processing system.

Page Scan: The electro-mechanical process of scanning a physical page (paper) to create a bit image of the page.

Pend: The suspension of a case while awaiting additional information or action, such as a particular document type or date.

Profile: A file that governs the categories of work performed and the type of users recognized by the system.

Queue: A line or list of items waiting to be processed, for example cases to be worked or messages to be displayed.

Queue Type Profile: A file that contains one entry for each queue type defined.

Scanning: A physical process that enters documents into a workstation. Once a document has been scanned, it can be stored permanently.

Workstation: An assemblage of units including a personal computer, workstation program software, an image display unit, scanners, and printers with which the user performs input, indexing and printing of images and alphanumeric text.

Workstation Program Software: Software that resides in the workstation. It provides services for the case management program and the image processing program for the display and printing of page images and alphanumeric coded data. The workstation program also provides for page capture, document image composition, image page working set interpretation and display, and document image transfer to the image processor.

OBJECTS OF THE INVENTION

It is an object of the invention to provide an improved method for document image management in a case processing system.

It is another object of the invention to provide an improved method for managing the storage of digitized documents which assures the availability of documents on faster, lower capacity storage devices when required, while removing those documents which are seldom needed and relying on a backup storage of a high capacity slower access storage device.

An additional object of the invention is to provide an improved method for document image management which enables the suspension of the case while awaiting the arrival of a missing document and then automatically recognizing the receipt of the missing document and, in response thereto, automatically reactivating the case.

It is a further object of the invention to provide an improved method for document image management which enables controlling the deletion of documents from a low capacity high speed first storage device only when such documents are no longer needed in other currently active cases.

It is yet a further object of the invention to provide an improved method for document image management which enables the matching of documents received with existing suspended cases and returning those cases to a predetermined work queue.

SUMMARY OF THE INVENTION

These and other objects, features and advantages are accomplished by the invention disclosed herein. A method is disclosed for document image management in a case processing system. The method includes the steps of storing a respective document type profile for each document type which is to be made a part of a case identified by a case ID in a work flow. When a first document image is scanned into the system it is assigned the first document ID. Along with this, a first document type and a case ID are also input. The first document ID and the first document type are stored and are related to the case ID. The first document image is stored on a DASD and, after reference to the document type profile, can be also stored on an optical storage, both stored images being related to the first document ID.

When the case is to be worked on in the work flow, the first document image is accessed from the DASD using the first document ID. As the case is being processed in the work flow, if it is determined that there is a need for a second type document and the second type document has not yet been scanned into the system, then, in accordance with the invention, the first document is placed in a pending state. First, it is determined from the profile if the first document type can be erased from the DASD. If so, then the first document has its image erased from the DASD. An entry is made in a case pending list, noting the case ID, the type of document which is missing from the case, the expiration date for the expected receipt of the missing document, and the return queue for the case.

Then a watch is maintained for the receipt of the missing document. The case pending list is periodically consulted to determine if the designated timeout has expired for the receipt of the missing second document type. If the timeout has expired, then the existing first document is transferred from optical storage to DASD and the case is placed in the return queue or an alternate if one has been specified in a queue type profile, so that a worker can check on why the second document has not been received.

When the missing, second document has been scanned into the system, and assigned a second document ID, the second document type and the case ID, the second document image is stored on the DASD. Additionally, the second document type profile is consulted to determine if the second document should also be stored on the optical storage and if so, it is stored on the optical storage. Both stored images of the second document are related to the second document ID and the case ID. Then the case pending list is checked to see if there are any more missing documents. If not, then any existing documents not currently on the DASD are transferred from optical storage to the DASD and the case is placed in the return queue or an alternate queue. When the case ID has its turn to be processed in the work flow, the first document image and the second document image are accessed from the DASD for processing in the case processing sequence of the work flow.

In this manner, economical use is made of the DASD storage, where cases must be placed in a pending state due to the necessity to await the arrival of missing document types.

Another feature of the invention is the controlling of the deletion of documents from the DASD in a manner which assures that documents which are no longer needed in a first case are available for still another active case being processed in the work flow. This is achieved by maintaining a use count for each document scanned into the system. As each document is scanned into the system, a use count is incremented associated with that document. Every active case for which the document is a member, will cause the use count to be incremented by unity. As each respective case is pended or closed, the use count for the corresponding document will be decremented. Similarly, if a document is to be printed, and is placed on a print queue, each occurrence of placement in a print queue will increment the use count by one and after the document is printed in each event, the use count is decremented by one. In the process of removing documents from the DASD which are not associated with an active case, the rule is followed that the use count is consulted and if its value is greater than zero, then the document will be maintained on the DASD until the use count is decremented to zero. In this manner, the deletion of documents is controlled so as to assure that documents which are no longer needed in one case are still available for another active case.

BRIEF DESCRIPTION OF THE DRAWINGS

These and other objects, features and advantages of the invention will be more fully appreciated with reference to the accompanying figures.

FIG. 2 is a memory image diagram of the memory 108 in the processor 106 of FIG. 1.

FIG. 8 is a depiction of a document type profile, in accordance with the invention.

DESCRIPTION OF THE BEST MODE FOR CARRYING OUT THE INVENTION

Figure 1:
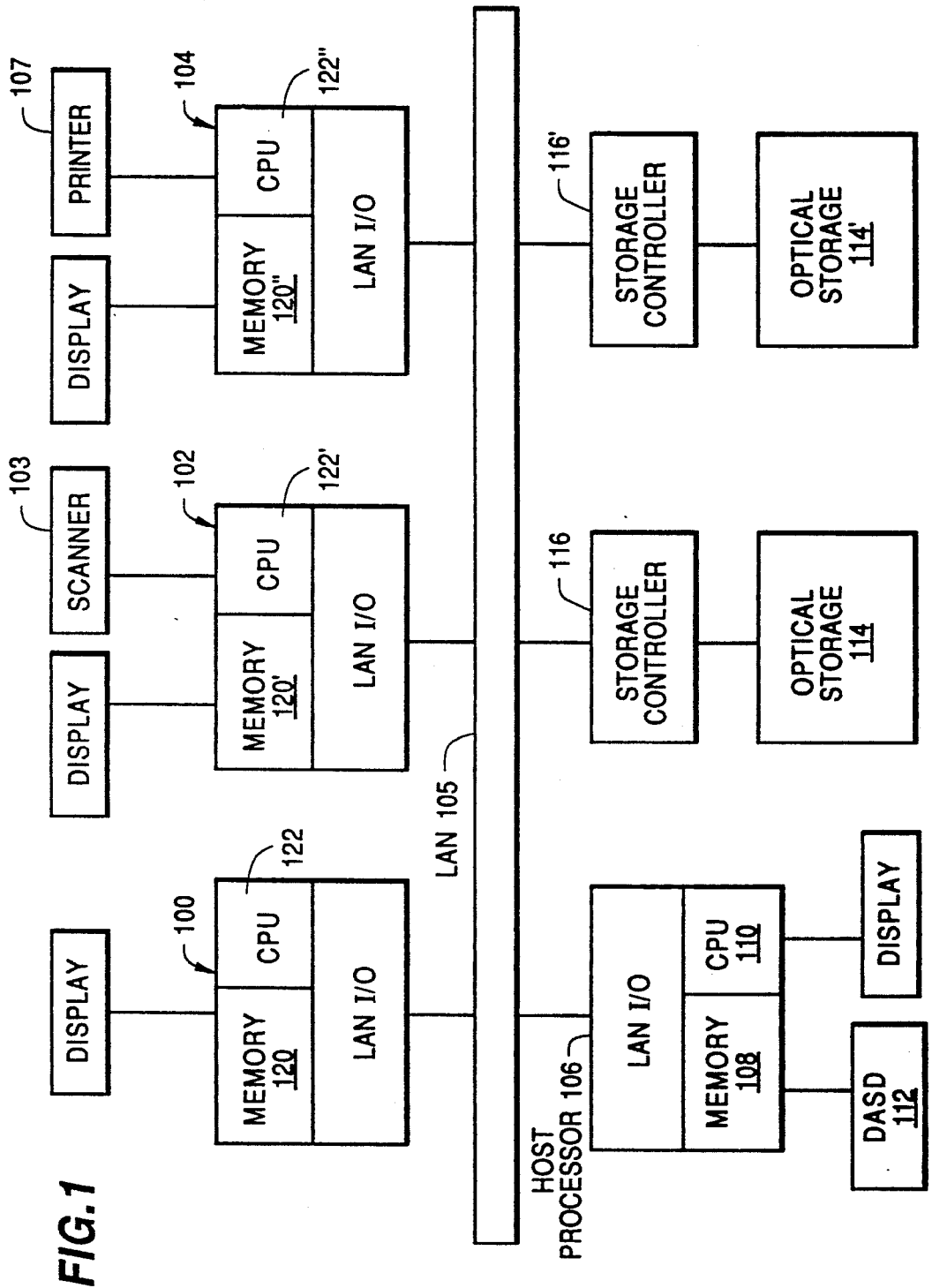
FIG. 1 is an overall architectural diagram of the system, in accordance with the invention.

FIG. 1 is an overall architectural diagram of the image document storage and retrieval system, in accordance with the invention. The architecture includes a local area network 105 which interconnects a system administrator's workstation 100, a first case processing workstation 102, a second case processing workstation 104, a host data processor 106, an optical storage 114, and optionally a second optical storage 114'. The optical storages 114 and 114' can be connected to the local area network 105 through respective storage controllers 116 and 116'. There can be as many as 256 workstations, a plurality of host data processors, and a plurality of optical storages. When there are a plurality of host processors, one will operate as the master processor and the next will operate in a slave processor mode. The system administrator's workstation 100 includes a CPU 122 and associated memory 120 and a display device. Similarly, the first case processing workstation 102 includes a memory 120' and CPU 122' and associated display device. The workstation 104 also includes a memory 120" and CPU 122". The first case processing workstation 102 further includes a scanner 103 which is capable of optically scanning a hard copy document, digitizing the image of the hard copy document and then inputting the digitized information to the first case processing workstation 102. The workstation 102 can then transmit over the LAN 105 to the host data processor 106 the digitized image of the scanned-in document, that digitized image being optionally compressed for enhanced bandwidth on the LAN 105. The workstation 104 can further include a printer 107 which can be commanded by the workstation 104 to print hard copy replicas of the digitized image of a document output from the host data processor 106 over the LAN 105 to the workstation 104, for example.

The host data processor 106 further includes a magnetic storage DASD (direct access storage device) which can have a storage capacity range of approximately 10 to 50 gigabytes, for example. The DASD 112 serves as the short term storage for digitized document images which have been scanned into the system of FIG. 1. Also connected to the local area network is the optical storage 114, through its storage controller 116. The optical controller 114 can have an on-line storage capacity of 128 gigabytes, for example. The optical storage 114 will serve as a long term, archival storage for the digitized document images scanned into the system of FIG. 1. The optional additional optical storage 114' serves a similar purpose to the optical storage 114.

A magnetic storage DASD 112 typically has an access time in the range of one to two seconds to retrieve an image from its storage medium, transmit that digitized, compressed image over the LAN 105 to a workstation, decompress the digitized image in the workstation, and display it on a display device at the workstation. By comparison, the optical storage 114 may require 30 seconds or more to perform the same task of displaying an accessed image on a workstation display. Taking into consideration that the storage capacity of a DASD 112 is less than approximately 10 percent of that on an optical storage 114 and further taking into consideration the relatively higher expense of DASD storage per image than the expense for optical storage of an image, it is apparent that a system operation can be enhanced by the proper management of the location of images between these two types of storage. In accordance with the invention, recognition is made of the intended use of the documents to be stored and the probability that those documents will be required by a user within a predetermined period of time. These document usage characteristics are characterized in a document profile, in accordance with the invention, and the system then partitions the length of time a document is respectively stored on the DASD 112 and the optical storage 114, based upon that document profile. By maintaining a document deletion practice based upon the document profile for a document, and by maintaining a usage count to signify any current need for the document, documents can by systematically deleted from the DASD and only retrieved from the optical storage when needed.

Further in accordance with the invention, when a case folder to which a plurality of document types is associated, has one document type missing, the document corresponding to that case folder can be deleted from the DASD 112 until the missing document type is scanned into the system, at which time documents associated with the case but which are no longer on the DASD can be retrieved from the optical storage in a staged manner so that all of the documents in a case folder may be available to the user after the receipt of the missing document. Still further, in accordance with the invention, an expiration time can be provided in the document profile characterizing the maximum time the user wishes to wait for the missing document, and when that maximum time occurs, the remaining documents in the case folder no longer present on the DASD can be retrieved from the optical storage and made available to the user so that the user can work the case and take additional steps which may be necessary to obtain the missing document.

Figure 9:
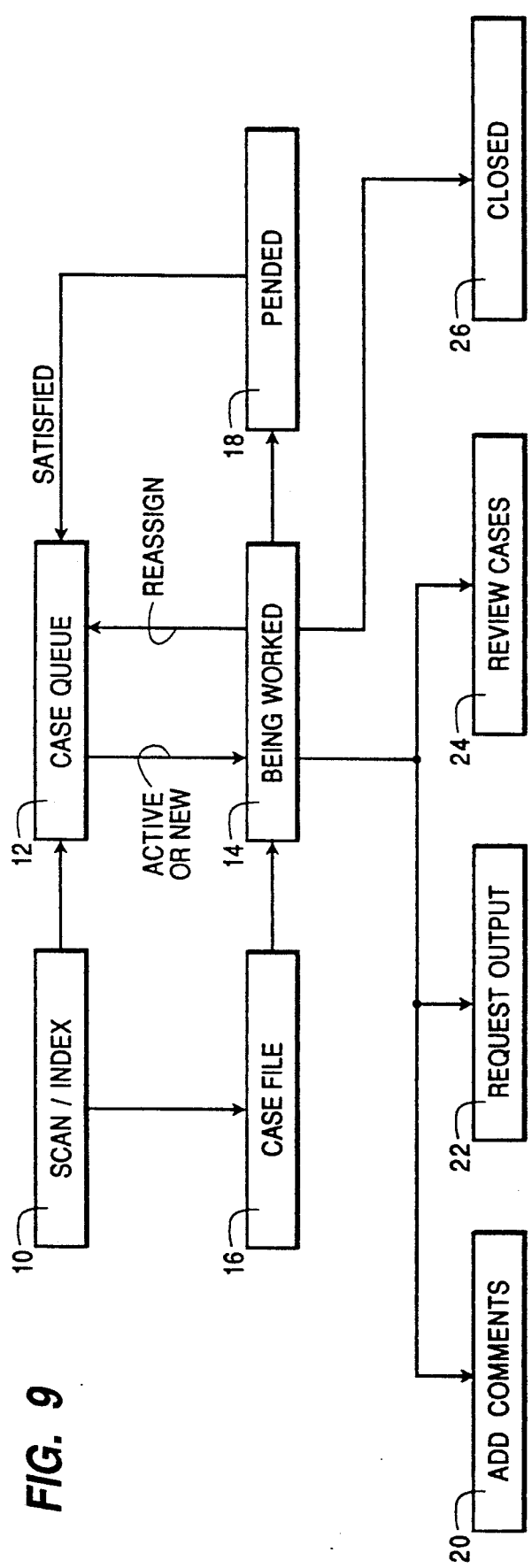
FIG. 9 is an overall diagram illustrating the processing flow for handling documents and cases in the system.

This overall processing flow is illustrated in FIG. 9 which shows a sequence of generalized processing steps which can be carried out by the system of FIG. 1. The step 10 scans in a document at the scanner 103, and the document can be identified with an index value. The document can then be input to a case queue 12 from which the documents pertaining to that case can be made available in step 14 when the case is being worked. Alternately, when a document is scanned-in in step 10, it can be directly stored in association with a case file in step 16. After a case has been worked in step 14, the documents associated with the case can be placed in a case queue 12. In another alternative, when a case is being worked in step 14, if it is determined that a document is missing from the case, then the case can be pended as is provided in step 18. After the pended condition is satisfied by the receipt of the missing document, the step 18 will transfer to the case queue step 12 where the case will await processing by a case worker in step 14. After the case with its documents has been worked, a variety of consequences can occur. In step 20, the case worker can add comments to the case file pertaining to the document. In step 22, the case worker can request an output which will be printed for example on the printer 107. In step 24, the case worker can review other cases which may be related to the current case or may be independent of the current case. In step 26, the case worker can close a current case after completion of work on that case.

FIG. 2 is an image of a portion of the memory 108 for the host data processor 106 in FIG. 1. The memory 108 is partitioned into several files. File 202 is a document file which keeps track of all documents scanned into the system of FIG. 1, and in particular includes a field for document ID, the address on the DASD 112 for the storage of the document, and the address on the optical storage 114 for the storage of the document. In accordance with the invention, the document file 202 also includes a use count field 220 which is incremented every time a user requests that the document be made available for printing on printer 107 or whenever the case is made active. This use count is decremented whenever a printing operation has been completed for the document or whenever the case with which the document is associated has been removed from the active status. Since the document could be in more than one case, if a document delete request is issued when one case is closed or pended but a second case also references the document, the existence of the active second case prevents deletion, through the incrementation of the use counter 220 for each event of activating a case containing the document. Another field in the document file 202 is the DASD expiration date which is primarily used for unqueued cases.

Another file in the memory 108 is the case folder file 204 which contains a case ID for all cases handled by the system of FIG. 1. Each case entry includes the case ID, corresponding identifier, such as a customer name, and the status of the case as being active, new, pended, unqueued and closed. A new case is a case which has not yet been worked. Also another file in memory 108 is the case cross-reference file 206 which has an entry for every document handled in the system of FIG. 1. The case cross-reference file establishes a cross-reference between each document ID and the corresponding case or cases of which it is a member.

Another file in the memory 108 is the case pending list file 208. When a case which has several document types associated with it, has a particular document type which is missing, the case worker will change the state of the active case to a pending case. When a case is pended, the ID of the case is entered into the case pending list file 208, the document type which is missing is entered, and the expiration date by which the missing document is expected to have arrived is also entered into the file. In addition, the return queue is designated for the case so that when the missing document is finally received, the case can be assigned to a designated queue for working. Still further, comments can be provided which can be used for assisting in the matching of a missing document with a particular case.

Another file in the memory 108 is the document deletion list for DASD file 210 which contains the document ID and the DASD address for each document which is designated to be deleted from the DASD. Another file in the memory 108 is the work queue file 212 which has as many entries as there are new or active cases in the system, and relates each case to a corresponding queue. Another file is the retrieve or staging file 214 which has an entry for each document ID which is to be retrieved from the optical storage 114 and placed on the DASD 112. Another file is the optical storage file 216 which has a document ID and corresponding DASD address for every document on the DASD which is to be stored on the optical storage 114. Another file is the reactivate list file 218, which has each case ID for which documents are being retrieved from optical store, and it lists all such documents to be retrieved for the case.

Figure 3:
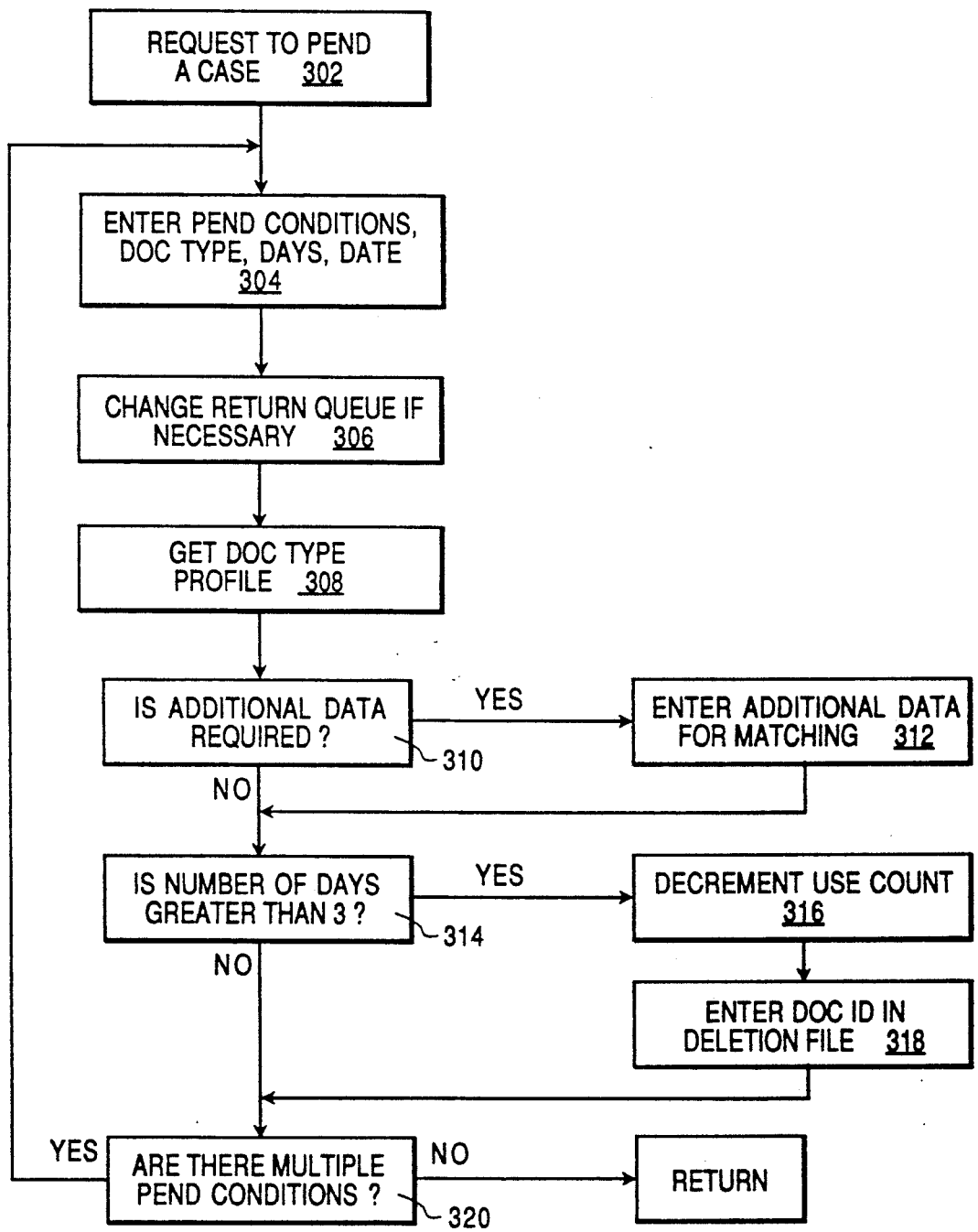
FIG. 3 is a flow diagram of the sequence of operational steps in pending a case.
Figure 7:
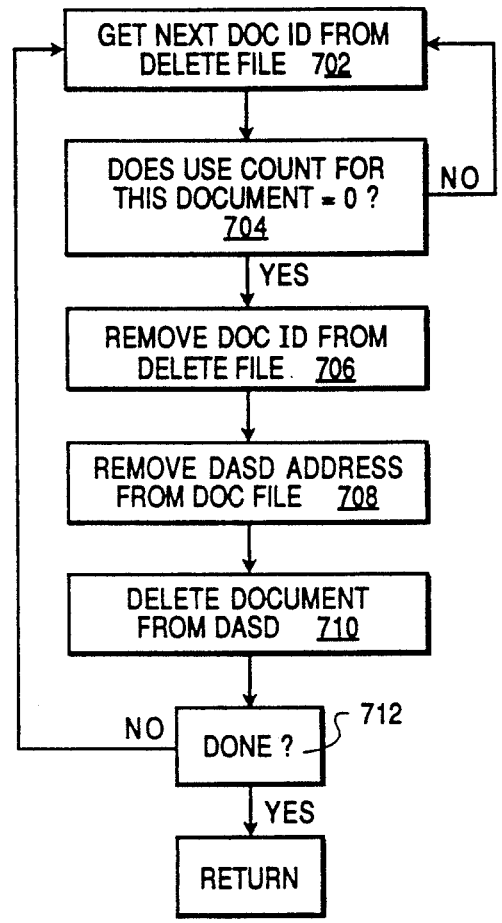
FIG. 7 is a flow diagram of the steps in deleting a document from the DASD 112.

FIG. 3 is the flow diagram for pending a case. A pend situation is one which arises in the processing of a case where there is not sufficient information to complete the processing of that case. For instance, in a customer service application, the receipt of a customer dispute letter may require supporting information to investigate the reason for the complaint or dispute. The case would then be pended awaiting the proper documentation to allow the dispute to be resolved. In step 302, the case worker inputs a request to pend a case. This case will have its status changed to pending in this step, with an entry in file 204. In step 304, the conditions for pend, be it a document type or some number of days, or a specific date, is entered in the case pending list file 208. In step 306, if appropriate, the queue to which the case will be returned when the pend conditions are satisfied, may be changed in file 208. In step 308, the document type profile, if this pend is for a document type, is checked and in step 310, if additional data is required to support matching that document type when it does return, then in step 312, that data is entered on in file 208 to facilitate the matching. For instance, a dollar amount of a disputed charge can be added so that when the charge slip is returned, the worker can make the distinction that he has the right charge slip. In step 314, the number of days for the pend entered in file 208 is checked to see if it exceeds the minimum pend time which can have a default of three days, for example. If it is greater than that minimum pend time, then in step 316, the use count 220 in file 202 for each of the documents of this case is decremented because the case is now no longer active, it now has a pending status. The documents in the case are flagged for deletion by creating an entry in the delete file 210 in step 318. The document deletion process is shown in FIG. 7. Finally step 320 checks to see if there are multiple pend conditions input by the worker and if there are, it goes back to step 304 to record the rest of the conditions.

Figure 4:
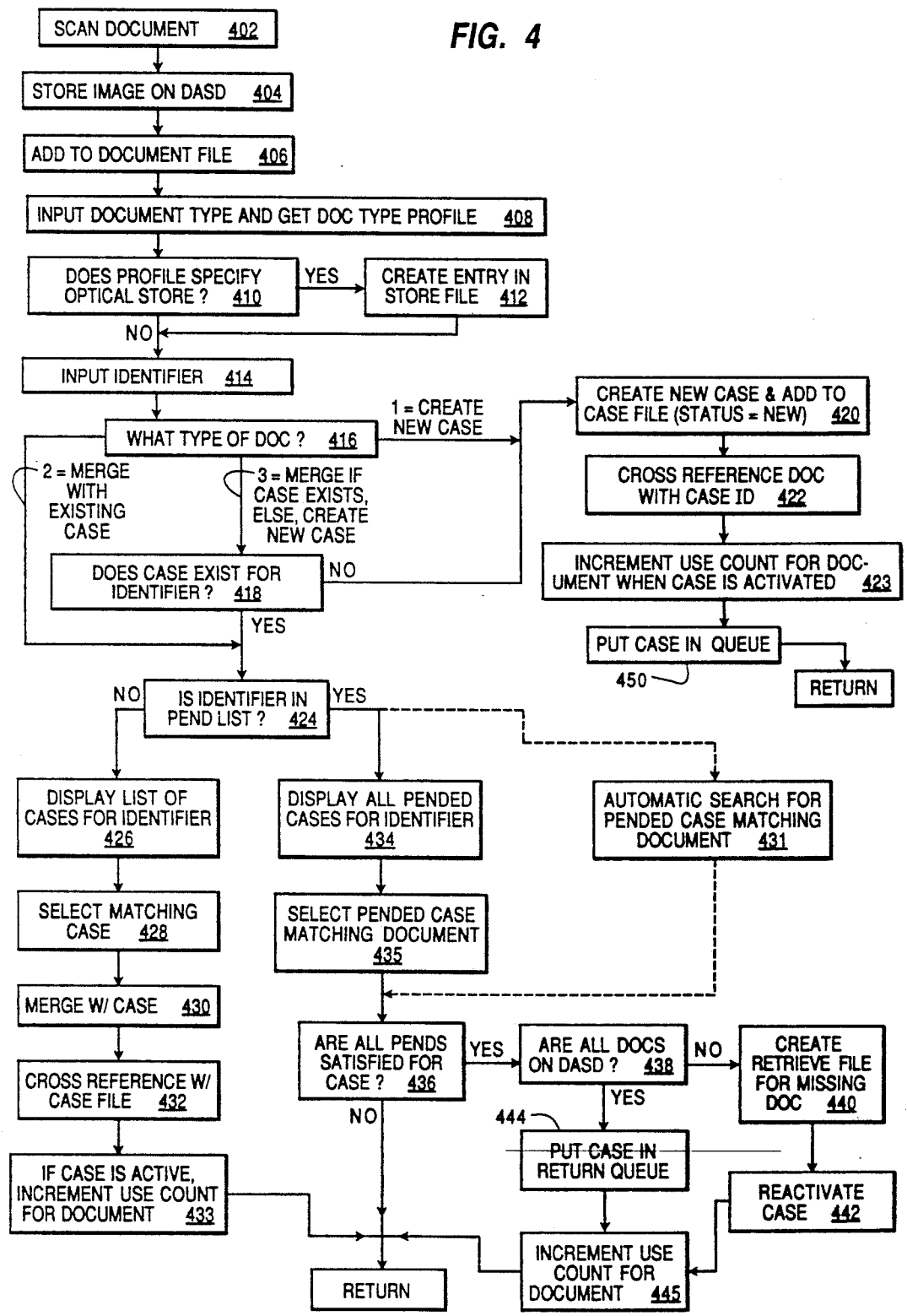
FIG. 4 is a flow diagram of the steps in storage management, scanning and indexing of documents.

FIG. 4 represents the input processing function and performs the scanning and indexing and storage management for the image processing system. Step 402 begins with scanning the document when a workstation has a scanner 103 and then in step 404, the document is stored on DASD 112. In step 406, the document ID is added to the document file 202 and the DASD address is recorded therein. The document ID may be a serially assigned number. In step 408, the worker inputs the document type for the document. Then the document type profile is accessed and step 410 checks to see if the profile specifies that this document is to be stored on optical storage 114. If the answer is yes, it creates an entry in the store file 216 and at some later time, the store program will put a copy of the document image on the optical storage 114. In step 414, the identifier is input. Either the case worker can key in this information or character recognition can be performed on the document to derive it. The method then begins to index the document according to rules in the profile for this particular document type. Step 416 applies those rules which establish whether the document is in a first, second or third category. The first category 1, indicates that we will always create a new case for this document type. Step 420 creates the new case, adds the case ID to the case file 204, and sets the case status to "new" since no one has yet worked this case. Step 422 cross-references the document just scanned with that case in the cross-reference file 206. Step 423 increments the use count 220 in the document file 202, when the case is activated. Step 450 then places the case into the return queue or into an alternate queue, if specified in the queue type profile. We will then be complete and can scan the next document. If the category is 2, that indicates that this document type is always merged with an existing case. Category 3 will merge the document with an existing case if one exists. If one does not, then a new case is created. Step 418 determines if a case exists for the identifier input for this document. If it does not, go back to step 420 and create the new case, step 422 performs the cross-reference, and in step 423 the use count is incremented. If a case does exist, then category 2 and category 3 merge the processing flow and the method determines whether the identifier exists in the pend list 208, i.e. is this a pended case in step 424. If the answer is no, then step 426 displays the list of cases that exist for this identifier in file 204 and the case worker selects the case which matches. We may have the situation where more than one case could exist for a single identifier. We select the matching case in step 428 and then step 430 merges the document with that matching case. This means that the document which we have scanned in, becomes part of (logically associated with) a case which previously existed in the system and the method then has to cross-reference this document with the case file in file 206 in step 432 and increment the use count 220 in step 433 if the case is active. If the identifier is on the pend list 208, so that the answer to the question in step 424 is yes, then step 434 displays all of the pended cases that exist for this particular identifier. In step 435, we would select the pended case which matches this particular document. Step 436 checks to see if all of the pends for this particular case are satisfied, because there could be more than one. We could be waiting for several different types of documents or date conditions, for example, in a mortgage loan case, you may be waiting for a credit check, you may be waiting for an appraisal of a property, or you may be waiting for a title search to return. The method determines if all of those pends are satisfied and if they are, then step 438 determines if all of the documents for this case on magnetic DASD 112. If the answer is no, then step 440 creates a retrieve file entry in file 214 for all the missing documents, so that at a later time, when the retrieve program is executed, those documents will be staged back to magnetic DASD 112. In step 442, the case is placed on the reactivate list file 218 so that when all of the documents listed for the case in reactivate list 218 are moved back to DASD, when that is satisfied, the case will then be reactivated. When the status of the case is returned to active, step 445 increments the use count 220 for the document. If the documents are all on DASD, the case in step 444 is placed on the return queue of the person that last worked with it, as shown in file 208 or on an alternate queue if one is specified in the queue type profile, and the use count 220 is incremented for the document, in step 445. The method then returns to the main system.

In an alternate embodiment of the invention, an automatic search method 431 can be done for the "other matching data" field in the case pending file 208, using an appropriate query term, substituting for steps 434 and 435 in FIG. 4. Suitable search methods are disclosed in copending U.S. patent application Ser. No. 299,181, filed Jan. 19, 1989 entitled "Method For Use of Morphological Information to Cross Reference Keywords Used For Information Retrieval" by Richard Carlgren, et al., assigned to IBM Corporation and incorporated herein by reference. The case worker can enter as search terms, the identifier and any additional terms characterizing the document scanned into the system. Then the Carlgren, et al. computer searching method can be applied to automatically search the case pending list file to locate the case ID whose "other matching data field" most clearly matches the search terms.

The invention allows the manipulation of documents on magnetic DASD to manage the DASD resource in such a way that cases which are needed at the moment are available on DASD for the optimum response time to the user and those which are not required because an event or a piece of information is not available to complete that processing, those documents can be removed from DASD until such time as the rest of the information is available in the case. Then, when the conditions are satisfied, the documents can be staged back to magnetic DASD from optical storage and presented to the appropriate user.

FIG. 8 is a view of the document type profile. The document type profile controls the flow and usage of each of the document types in each processing system. It can be initialized to represent the unique documents of any customer application. It contains such information as whether the document is to be stored on optical storage 114. If the document is of a temporary nature, you may not wish to store it on optical. It controls the number of days that a document will be kept on DASD. It contains the rule by which documents are indexed. The "create new case" indicator refers to three sets of rules which are later used in storage management, scanning and indexing to process the documents in the system. Once those documents are in the system, it has an entry which specifies the pend process, the maximum number of days for pend, whether or not a document should be stored, should be removed from magnetic DASD when it is pended, and whether or not additional data is required to match that document.

Figure 10:
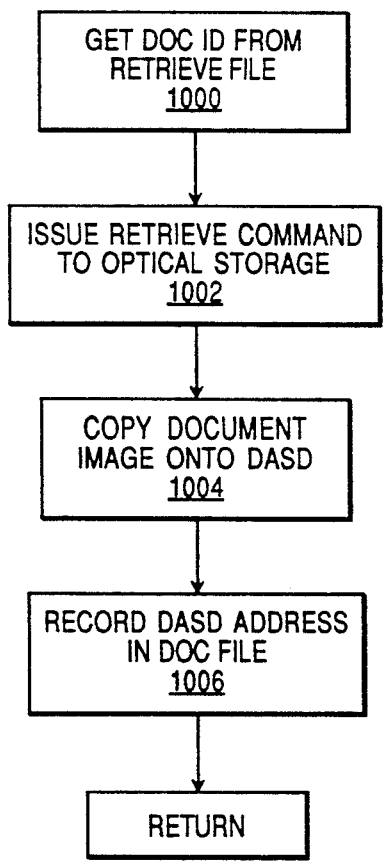
FIG. 10 is a flow diagram of the steps in transferring a document from optical storage to DASD.

FIG. 10 is the flow of the retrieve or staging process which is used to bring documents back from the optical storage 114 to the magnetic DASD 112. Step 1000 gets the document ID from the retrieve file 214, step 1002 issues the retrieve command to the optical storage. The optical storage 114 performs the necessary steps to retrieve the image from the optical media and sends it to the system processor 106. In step 1004, a record of the document image is created on magnetic DASD 112 of the system processor 106. Step 1006 then records the DASD address of the image in the document file 202 and processing returns to the system.

Figure 5:
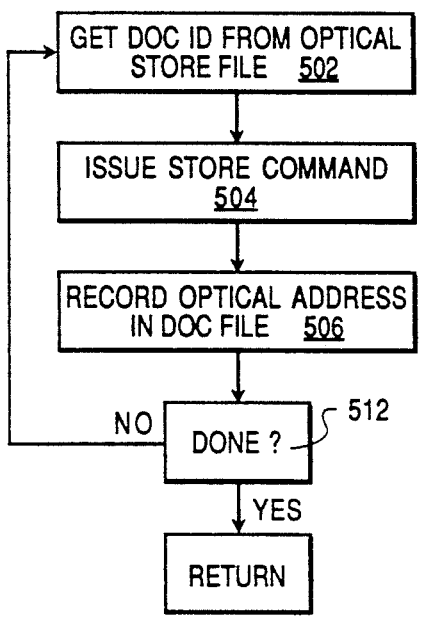
FIG. 5 is a flow diagram of the steps in storing a document on the optical storage 114.

FIG. 5 is the flow diagram of the steps for storing a document on the optical storage 114. Step 502 picks the document ID from the storage file 216. Then step 504 issues a storage command. Step 506 records the optical address for the document in the document file 202. In step 512 it is determined whether there are any more documents to store and if there are, the process then flows to step 502. If not, then the process returns to the main program.

Figure 6:
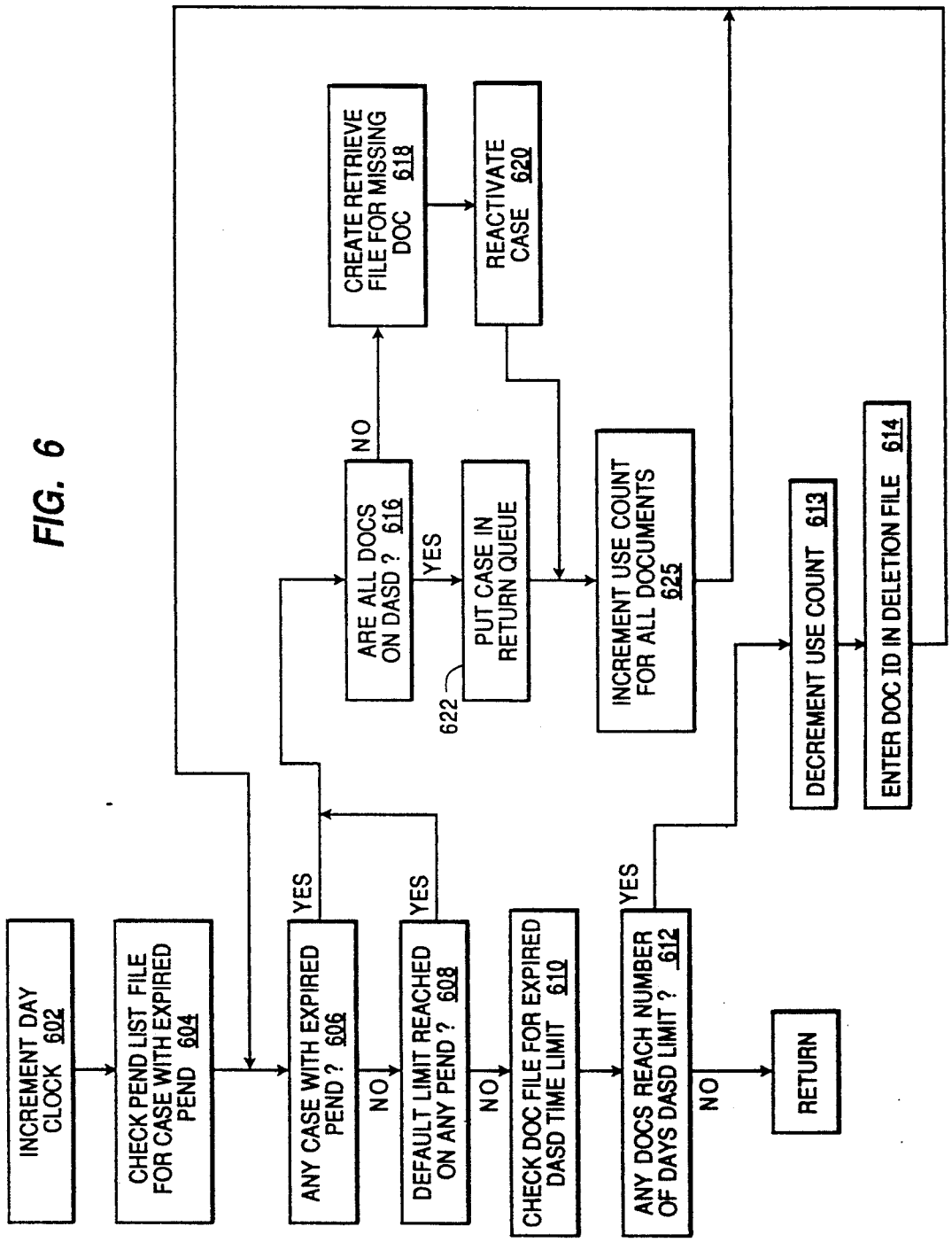
FIG. 6 is a flow diagram of the steps in the management of time pended cases.

FIG. 6 is a flow diagram of the management of time pended cases. In step 602, the day clock is incremented. Then in step 604, the pend list 208 is checked for any expired pends. In step 606, if an expired pend is determined, then step 616 determines whether all existing documents for the case are on the DASD 112. If some documents are not on the DASD, then step 618 flags documents for staging to the DASD by identifying all existing documents in the case from cross-reference file 206, identifying all of the documents which are not on DASD from document file 202, and entering those document IDs in the retrieve file 214 and the case reactivate list file 218. Step 620 then places the case in the reactivate list. If step 616 determines that all documents are on the DASD, then step 622 places the case in the return queue. Step 625 increments the use count 220 for all documents in the case when the case is activated.

If step 606 determines that there are no expired pends, then step 608 determines from the document profile whether the default time limit has been reached by any pended case. If yes, then the process flows to step 616. If no, then the process flows to step 610 where the document file 202 is checked for any expired DASD time limit. Step 612 determines whether any documents have reached the number of days on the DASD limit. If yes, then those documents are flagged for deletion from the DASD by decrementing the use count 220 for a document in step 613 and then entering the document ID in the deletion file 210 in step 614. The deletion process is shown in FIG. 7. The process then returns to the main program.

FIG. 7 is a flow diagram of the deletion steps. In step 702, the document ID is accessed from the delete file 210. Then in step 704, it is determined whether the use count value is zero in the use counter 220 of the document file 202. If not, then the document is retained on DASD 112, so as to be available for other active cases or for the print queue of printer 107, and then the next document ID is obtained and the process returns to step 702. However if the use counter is zero, then in step 706, the document ID is removed from the delete file 210 and in step 710, the document image is deleted from the DASD. Step 712 determines if the process is done and if it is, it returns to the main program, if it is not, then it returns to step 702.

The resulting invention manages the storage of digitized document images on a magnetic DASD and an optical storage, so as to minimize average response time, and minimize overall storage cost, consistent with the probable usage of the documents being archived.

Although a specific embodiment of the invention has been disclosed, it will be understood by those having skill in the art that changes can be made to that specific embodiment without departing from the spirit and the scope of the invention.

What is claimed is:

1. In a digitized document image storage and retrieval system, for storing document images organized into a plurality of cases having a common case format defining a plurality of document types required in each case, a method for managing the storage of digitized documents comprising the steps of:

receiving a first document image having a first document type and inputting an identifier and first document type characterization to said system and assigning a first document ID thereto;

deriving a case ID from said identifier;

storing said first document image on a DASD storage device and on an optical storage device;

storing said first document ID and an address of said first image in said optical storage, in a document file in a memory in said system and cross referencing said first document ID with said case ID;

inputting a pend command and a second document type characterization to said system, to remove said first document image from said DASD storage device until said system receives a document image having a second document type for said case ID, and storing a pending status for said case ID in said memory;

storing said case ID and said second document type characterization in a case pending file in said memory;

deleting said first document image from said DASD storage device;

receiving a second document image having said second document type and inputting said identifier and second document type characterization to said system and assigning a second document ID thereto;

storing said second document image on said DASD storage device;

storing said second document ID and an address of said second image in said DASD storage, in said memory in said system and cross referencing said second document ID with said case ID;

accessing said case pending file in said memory to determine whether said case ID is stored therein;

comparing said second document type characterization stored in said case pending file with said second document type characterization inputted with said step of receiving said second image, and in response thereto, accessing said first image from said optical storage and transferring it to said DASD storage;

substituting an active status for said pending status for said case ID in said memory and displaying a notice of said active status.

2. In a digitized document image storage and retrieval system, for storing document images organized into a plurality of cases having a common case format defining a plurality of document types required in each case, a method for managing the storage of digitized documents comprising the steps of:

receiving a first document image having a first document type and inputting information representing a first case ID and first document type characterization to said system and assigning a first document ID thereto;

storing said first document image on a DASD storage device and on an optical storage device;

storing said first document ID and an address of said first image in said optical storage, in a document file in a memory in said system and cross referencing said first document ID with said first case ID;

storing a value of unity in a use count field of said document file for said first document ID;

inputting information representing a second case ID and cross referencing said first document ID with said second case ID;

incrementing by unity said use count field of said document file for said first document ID;

inputting a pend command and a second document type characterization to said system, to remove said first document image from said DASD storage device until said system receives a document image having a second document type for said first case ID, and storing a pending status for said first case ID in said memory;

decrementing by unity said use count field of said document file for said first document ID;

storing said first case ID and said second document type characterization in a case pending file in said memory;

accessing said use count field and only if its value is zero, then in response thereto deleting said first document image from said DASD storage device;

receiving a second document image having said second document type and inputting said first case ID and second document type characterization to said system and assigning a second document ID thereto;

storing said second document image on said DASD storage device; storing said second document ID and an address of said second image in said DASD storage, in said memory in said system and cross referencing said second document ID with said first case ID;

accessing said case pending file in said memory to determine whether said first case ID is stored therein;

comparing said second document type characterization stored in said case pending file with said second document type characterization inputted with said step of receiving said second image, and in response thereto, determining whether said first document image is on said DASD and if it is not, then accessing said first image from said optical storage and transferring it to said DASD storage;

substituting an active status for said pending status for said first case ID in said memory, incrementing by unity said use count field of said document file for said first document ID and displaying a notice of said active status.

3. In a digitized document image storage and retrieval system, a method for managing the storage of digitized documents comprising the steps of:

inputting a digitized document into the system;

storing the digitized document on a DASD and entering a record of the document ID and DASD address in a document file;

storing the document on an optical storage in the system and entering the optical address in said document file entry;

incrementing a use count in said entry in said document file for said document when a case which includes said document is activated;

changing the status of said case to pending and entering a pending status in a case pending list when a document type is missing from said case;

decrementing said use count for said document in said pending case;

storing in a case pending list the ID of said case, said missing document type, and the maximum time for waiting for the missing document;

deleting said document from said DASD when said expiration date occurs;

inputting said missing document;

transferring said original document from said optical storage to said DASD in response to the receipt of said missing document;

incrementing said use counter in said document file;

placing said case containing said missing document and said original document in a work queue in response to the activation of said case.

4. The method of claim 3 wherein said step of placing said case, further comprises the steps of:

selecting an alternate work queue;

placing said case containing said missing document and said original document in said alternate work queue in response to the activation of said case.

* * * * *